United States Patent
Holloway

(10) Patent No.: US 9,115,022 B2
(45) Date of Patent: Aug. 25, 2015

(54) PROCESS TO ATTACH THERMAL STENCILS TO A GLASS SUBSTRATE AND PERMANENTLY ETCH A MARK THEREIN

(71) Applicant: Matthew R. Holloway, Gilbert, AZ (US)

(72) Inventor: Matthew R. Holloway, Gilbert, AZ (US)

(*) Notice: Subject to any disclaimer, the term of this patent is extended or adjusted under 35 U.S.C. 154(b) by 58 days.

(21) Appl. No.: 13/773,632

(22) Filed: Feb. 21, 2013

(65) Prior Publication Data

US 2014/0231387 A1 Aug. 21, 2014

(51) Int. Cl.
| | |
|---|---|
| C23F 1/00 | (2006.01) |
| B44C 1/22 | (2006.01) |
| C03C 15/00 | (2006.01) |
| C03C 25/68 | (2006.01) |
| C25F 3/00 | (2006.01) |
| C09J 129/04 | (2006.01) |
| C09K 13/08 | (2006.01) |

(52) U.S. Cl.
CPC .............. *C03C 15/00* (2013.01); *C09J 129/04* (2013.01); *C09K 13/08* (2013.01); *Y10T 156/10* (2015.01); *Y10T 428/24934* (2015.01)

(58) Field of Classification Search
CPC ... B41N 1/243; H01L 21/31144; C03C 15/00
USPC .......................................... 216/31, 43, 45, 97
See application file for complete search history.

(56) References Cited

U.S. PATENT DOCUMENTS

| 95,617 | A | | 10/1869 | Strauss | |
|---|---|---|---|---|---|
| 4,585,514 | A | * | 4/1986 | Scallan | ............................ 216/54 |
| 4,781,792 | A | * | 11/1988 | Hogan | ............................. 216/36 |
| 5,151,572 | A | | 9/1992 | Jack | |
| 5,771,803 | A | * | 6/1998 | Takami | ..................... 101/128.21 |
| 7,276,181 | B2 | | 10/2007 | Miwa | |
| 2002/0095010 | A1 | * | 7/2002 | Cai et al. | ......................... 524/553 |
| 2004/0117936 | A1 | * | 6/2004 | Kaminstein et al. | ............. 15/245 |

OTHER PUBLICATIONS

"EPA_TapWater", Webpage, May 31, 2013.*

* cited by examiner

*Primary Examiner* — Binh X Tran
*Assistant Examiner* — Thomas Pham
(74) *Attorney, Agent, or Firm* — Schmeiser, Olsen & Watts LLP

(57) ABSTRACT

A high resolution stencil is produced by a thermal printer for the purposes of permanently etching glass for parts identification, tracking and labeling. An improved process to attach the stencil to the glass substrate is defined. An amended aqueous adhesive is used to bind the stencil so that it is in direct contact with the glass at all times and across the entire plane of the stencil and the adhesion is aided by use of a straight-edged tool to help evacuate any potential elements which may hinder the prescribed glass etching compound(s) from completing a clear and precise permanent mark.

16 Claims, 2 Drawing Sheets

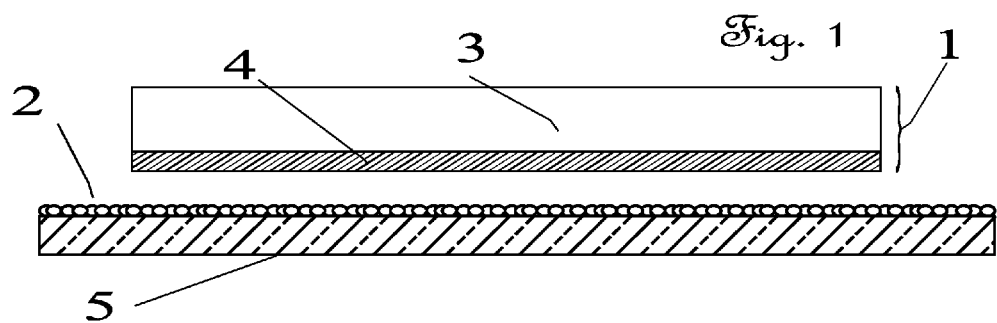
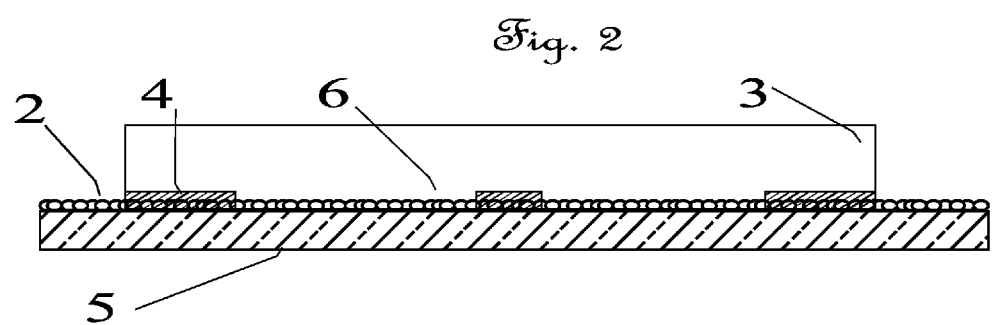
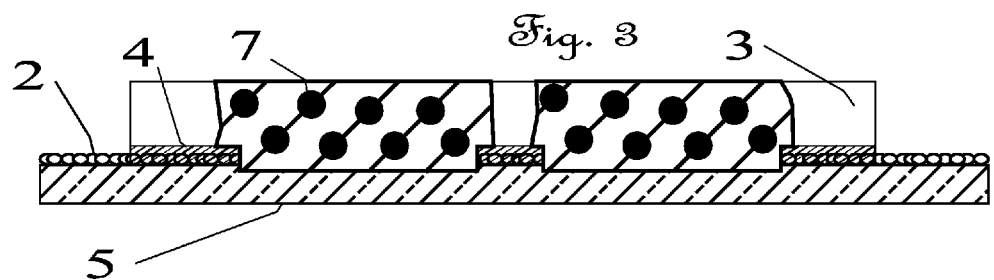

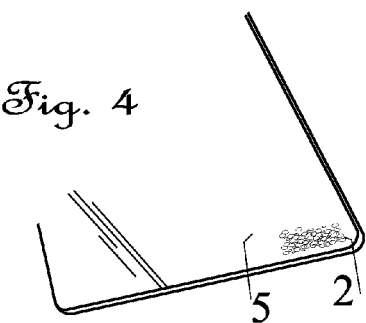
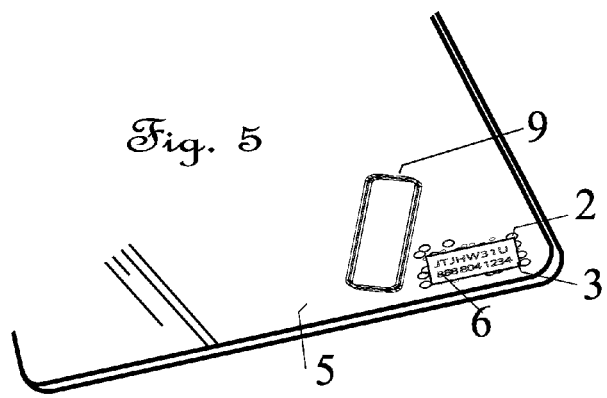
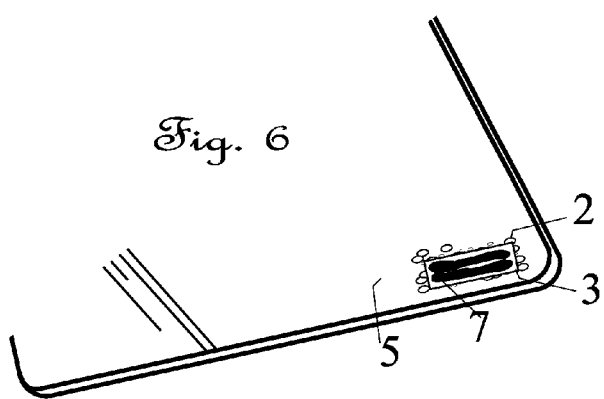
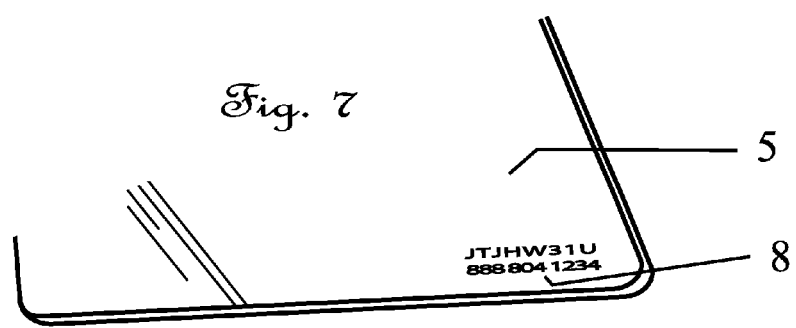

PROCESS TO ATTACH THERMAL STENCILS TO A GLASS SUBSTRATE AND PERMANENTLY ETCH A MARK THEREIN

REFERENCES CITED

| U.S. Patent Document(s): | | | |
|---|---|---|---|
| 95,617 | October 1869 | STRAUSS | 156/663 |
| 4,585,514 | April 1986 | SCALLAN | 216/54 |
| 4,781,792 | November 1988 | HOGAN | 216/36 |
| 5,151,572 | September 1992 | JACK | 219/121.69 |
| 5,771,803 | June 1998 | TAKAMI | 101/128.21 |
| 7,276,181 | October 2007 | MIWA | 252/79.3 |

FIELD OF THE INVENTION

The invention pertains to the field of thermal marking stencils and permanently etching the surface of glass. Glass etching has been used for decades for the purposes of marking identifying marks, symbols, logos, images, serial numbers including vehicle identification numbers and strings of alphanumeric digits to the surface of individual glass parts or glass parts which partly constitute a whole good or item, including vehicles. Glass etching is especially useful in preventing or otherwise thwarting the theft of these goods and in identification of parts.

BACKGROUND OF THE INVENTION

Previous methods of marking glass have ranged from stickers and non-permanent decals which are temporary and have otherwise, no theft deterrent or permanent identification properties, to engraving the glass surface with a carbide or diamond tipped bit in which requires a skilled craftsman's freehand to obtain an aesthetically pleasing result and which also has a drawback of the possibility of the glass cracking by an unskilled hand, to various methods of chemical etching to obtain a permanent etch mark and also using a focused laser light to mark glass items.

Over the past one hundred years many inventions have been developed proposing different incarnations of glass etching chemical compositions, it is known from these that the silicon dioxide which constitutes a large part of the makeup of glass can be etched by a reaction with sulfuric or fluoric acid, or one or a composition using a combination of hydrogen fluoride, sodium fluoride, potassium fluoride, ammonium fluoride, potassium biflouride, sodium biflouride, ammonium biflouride, ammonium borofluoride and ammonium silicofluoride.

Various processes have been suggested using the above mentioned articles and the subsequent herein mentioned patents. U.S. Pat. No. 95,617 suggests utilizing lead letters first placed upon to a horizontal glass surface. A coating non-reactive to a chemical glass etching compound is applied to the glass in the spaces around which the lead is laid. The letters are then taken from the glass to expose the uncoated glass underneath in which the suggested etchant, hydrogen fluoride, is to be applied and wherein the exposed glass is allowed to react with the etchant, thereby permanently marking the glass in just the non-coated areas of the glass where the etching compound was applied. Methods utilizing a non-reactive coating to mask the glass, either by employing lead letters as suggested in the above mentioned patent or by hand with a non-reactive oily pen as described in U.S. Pat. No. 7,276,181 example 7, to create a "chemical" or "oil" mask wherein a glass etchant can then be applied to the non-coated glass are extremely tedious as each step requires a skilled craftsman and hand application can be time and labor intensive to effectively mask the negative image of the desired mark.

U.S. Pat. Nos. 4,585,514 and 4,781,792 suggests methods for marking glass employing a masking tissue film and a known reactive glass etching compound and a procedure for attaching the mask tissue film to the glass employing a liquid solution which has no mechanical adhesive properties but merely held in place with a liquid Van der Waals (capillary) action. Using these protocols will not only result in a mask which may move upon the plane of the glass while wet when the etching compound is brushed on to the mask, thereby skewing the permanent mark, it also may result in which their mentioned liquid mask securing solutions, which are noted not to let fully evaporate, from diluting the etching compound and/or allowing the etching compound to leach into the aqueous securing solution thereby allowing the etching compound to get into and under the still wet tissue mask. Specific to U.S. Pat. No. 4,781,792, the mentioned alkaline aqueous solution is used to concurrently secure the mask to the glass and to neutralize the etchant compound after sufficient time for marking has elapsed when the mask is detached from the glass. Because this aqueous solution is basic and consequentially has a PH value of over 7, and it is mentioned to not let the basic neutralizing solution to evaporate from the stencil mask before applying the glass etching solution acid having a PH value lower than 7, the alkaline liquid solution will combine with the marking compound and render the etchant somewhat PH neutralized and diluted, thereby resulting in an incomplete mark. Moreover, a stencil template which is produced by their recommended practice of using an impact printer such as a typewriter does not result in clear and sharp lines or details also resulting in a low dots per inch, because the print head impacting the stencil media does not fully remove and only displaces the desired resist areas in which constitutes the design to be marked, thereby leaving some resist material remaining in the area desired to be etched.

U.S. Pat. No. 5,151,572 discloses a method of making a stencil employing a laser cutting device to "cut" a desired design, with the aid of a computer and layout software, into an adhesive backed label with a releasable backing strip. The laser is applied to the stencil label with backing strip to vaporize the polyester topcoat, and the adhesive bottom coat thereby leaving an appropriate stencil mask in which is to be applied to a glass part and chemically etched. While this method tries to eliminate some of the flaws inherent with U.S. Pat. Nos. 4,585,514 and 4,781,792, it brings about some misgivings of its own. A laser light with accompanying user interface design and computer hardware is very big and cumbersome, requires corded power and input/outputs and is costly to acquire the equipment, maintain the equipment and to cut each stencil mask.

BRIEF SUMMARY OF THE INVENTION

Industries including automotive, insurance and security companies, glass companies and consumer goods manufacturing companies have long seen and believed in the numerous benefits of permanently marking glass for anti-theft security, goods identification and recovery and also for logo and identification branding of glass parts. Herein presented is a process for producing a high resolution glass marking stencil, made from a bi-layer media consisting of a permeable paper tissue layer with another layer resistant to various glass etching compounds, a specification to thermally "print" into the resist layer of the said media resulting in disintegration and micro perforations of the aforementioned non permeable resist layer by means of a direct thermal printer hardware device in only those areas specified in the stencil design digitally supplied to the thermal printer and to securely attach the "printed" stencil to a desired area of glass which is to be etched. Then a glass etchant compound is brushed or applied to the stencil mask resulting in a permanent etch after a specified amount of time.

BRIEF DESCRIPTION OF THE DRAWING

FIG. 1 shows a sectional view of the bi-layer media (1) further showing the permeable layer (3) and the non-permeable layer (4) and a glass surface substrate (5) with aqueous adhesive solution (2) applied to it.

FIG. 2 shows a sectional view of custom printed stencil (6) applied to said glass surface.

FIG. 3 shows a sectional view of the printed stencil applied to a glass surface with the etching compound (7) percolating through all permeable areas (3) of stencil to mark the substrate with the custom design of the stencil FIG. 4 shows a perspective view of glass surface area to be etched (5) and aqueous adhesive solution (2) applied.

FIG. 5 shows a perspective view of custom stencil (6) applied to surface substrate. This view shows the use of straight edged tool (9) to clear leftover aqueous solution to effectively attach stencil to substrate suitable for etching.

FIG. 6 shows a perspective view of custom stencil applied to surface with the etching compound (7) percolating through all permeable areas of the stencil to mark the surface.

FIG. 7 shows a perspective view of the finished process whereas a glass substrate has been wiped of stencil media and etchant compound leaving a permanent mark (8).

DETAILED DESCRIPTION OF THE INVENTION

A custom stencil image is designed by a computer software layout program and is digitally transferred to be produced by means of a direct thermal printer device through a bi-layer media (1) consisting of a pervious layer paper media (3) made from a permeable paper sheet primarily manufactured from natural fibers, such as hemp, nitrocellulose, paper mulberry, and manila; a synthetic material consisting of fibers such as polyethylene terephthalate, polyacrylonitrile; or a compound fiber such as rayon, coated on top thereof or manufactured impregnated with a non-permeable to glass etchant composition resist layer (4) made from a thermoplastic resin, polyester or polyester resin and silicon particulate coated layer. Only where the stencil image is thermally printed to the bi-layer media by a direct thermal print head, the non-permeable resist layer is thermally perforated and now is effectively rendered permeable to an etching compound by means of said printer device and now a stencil mask for glass etching (6) is therefore produced.

Use of the created stencil to attach the stencil mask to and in turn, mark the appropriate glass substrate surface (5) is described in detail and includes the steps listed herein. Spray, rub, brush or by any means apply to the glass substrate area to be etched or in addition; to the non-permeable resist stencil area, with any PH neutral or acidic aqueous adhesive solution (2) which does not; change or dilute the effectiveness of glass etching chemicals; does not further mask any of the glass etchant composition from percolating through the permeable areas of the stencil mask or mask the glass thereupon the created stencil is applied; or has any contaminating effect on said glass surface to be etched or the stencil, thereby rendering the glass etchant composition less or minimally effective. Place the printed resist layer of the stencil media onto this wetted glass surface area and forcibly rub an appropriately sized straight edged device of any clean precision tool like a plastic card (9) over the stencil to evacuate any remaining aqueous solution which will detachably secure the printed stencil directly in contact with the glass substrate surface thereby restraining the stencil media to move easily across the glass surface plane. Any remaining aqueous adhesive solution is then allowed to fully evaporate to both; assure the aqueous adhesive solution does not change the viscosity, dilute or alter the chemically reactive properties of any glass etchant solution which will henceforth be applied to the stencil; and to allow the adhesive particles to fully cure effectively further securing the stencil media to the glass surface to be etched. Next, brush, rub, dab, or by any means, apply any appropriate marking or etching compound (7) containing one or a combination of sulfuric or fluoric acid, or one or a composition using a combination of hydrogen fluoride, sodium fluoride, potassium fluoride, ammonium fluoride, potassium biflouride, sodium biflouride, ammonium biflouride, ammonium borofluoride or ammonium silicofluoride only to the permeable layer of the stencil, specifically in the printed areas of the stencil, taking care not to get the etching compound off the stencil and onto the bare unmasked glass, which will not react or permeate the non-porous, non-printed areas of the resist layer of the stencil, and will allow the etch compound to percolate down through all permeable areas of the stencil to the bottom where the media is in direct contact with the glass surface to be etched. Only the glass surface in contact with the compound will be etched with the stencil image. Taking into account ambient temperature, only after a specified amount of time, following industry accepted etch time guidelines corresponding to the specific makeup of etching compound, should the stencil media be forcibly detached from the glass surface substrate and henceforth, immediately cleaned of all residual adhesive, and or stencil media and or etching compound. A permanent mark (8) is therefore etched into the glass surface.

Disclosed herein is a process to permanently chemically etch a glass substrate comprising the steps herein listed:
(a) applying an aqueous adhesive solution to a clean glass surface in the area to be etched;
(b) applying to the wetted glass resist side down, a preprinted thermal bi-layer stencil; said bi-layer stencil media manufactured with a pervious layer, permeable to glass etching compounds and a resist layer, non-permeable to glass etching compounds; in which said bi-layer stencil is printed with a design indicia, including but not limited to, a serial number, VIN number, logo, barcode, picture; in which said non-permeable resist layer is rendered permeable, by thermal perforations from a thermal print head, only in the exact design indicia to be etched, printed to it by the printer;
(c) further securing the stencil, which has been applied to the wetted glass, by scraping across the surface of the stencil, with a straight edged tool, to force out any remaining air and pockets of the aqueous solution;
(d) allowing the adhesive aqueous solution to evaporate from the wetted stencil and glass to further complete the detachable bond between the stencil and the glass, facilitated by the adhesive binding the stencil to the glass;
(e) applying a glass etching compound to all permeable areas of the printed stencil including that area of the stencil resist layer delineated to it by the thermal print perforations, allowing the etch compound to percolate down through the bi-layer stencil where it is in direct contact with the glass to be etched, and allowing sufficient time for the glass etching compound in contact with the glass to react and complete a permanent mark substantially similar to the design indicia printed to the stencil;

(f) removing the stencil from the glass surface; and (g) cleaning the glass containing any residual glass etchant compound and/or adhesive, with a glass cleaner or detergent.

In some embodiments, the aqueous adhesive solution is made from a liquid or a combination of liquids which are not reactive to: glass substrates; paper made from natural or synthetic fibers; and plastic resins, which have an evaporation rate equal to or faster than of water, leaves no residue after evaporation and in which an adhesive substance readily dissolves into; and a natural or synthetic adhesive which does not, change, react with or dilute the effectiveness of the glass etching compound, does not mask the glass etchant compound from percolating through the permeable areas of the stencil and does not mask the glass thereupon the stencil is applied. In some embodiments, the aqueous adhesive solution has a combined PH value between 4.5 and 7. In some embodiments, the evaporation rate of the aqueous adhesive solution can be increased with the use of an electric heat gun or butane heater so as long as the supplied heat does not alter the printed stencil.

In some embodiments, the bi-layer media is made from a permeable paper sheet primarily manufactured from natural fibers, such as hemp, nitrocellulose, paper mulberry, and manila; a synthetic material consisting of fibers such as polyethylene terephthalate, polyacrylonitrile; or a compound fiber such as rayon, coated on top thereof or manufactured impregnated with a non-permeable to glass etchant composition resist layer made from a thermoplastic resin, polyester or polyester resin and silicon particulate coated layer. In some embodiments, the resist stencil layer is thermally perforated by means of a direct thermal printer.

In some embodiments, the glass etching compound is a chemical compound containing one or a combination of sulfuric or fluoric acid, or a composition using a combination of hydrogen fluoride, sodium fluoride, potassium fluoride, ammonium fluoride, potassium biflouride, sodium biflouride, ammonium biflouride, ammonium borofluoride or ammonium silicofluoride.

In some embodiments, the straight edged tool is a tool with at least one side edge having a length appropriately sized to the stencil dimension, which is free of curves or serrations, made from any rigid or pliant plastic, metal, wood, phenolic resin or rubber and which can scrape the stencil and the aqueous adhesive solution and air underneath the stencil without impairing the designed use of the said bi-layer stencil and/or substrate.

Disclosed herein is a process to permanently chemically etch a glass substrate comprising the steps herein listed:

(a) applying an aqueous adhesive solution to a clean glass surface in the area to be etched;

(b) applying to the wetted glass resist side down, a preprinted thermal bi-layer stencil in which said aqueous adhesive solution has also been applied to the resist side of the stencil; said bi-layer stencil media manufactured with a pervious layer, permeable to glass etching compounds and a resist layer, non-permeable to glass etching compounds; in which said bi-layer stencil is printed with a design indicia, including but not limited to, a serial number, VIN number, logo, barcode, or picture; in which said non-permeable resist layer is rendered permeable, by thermal perforations from a thermal print head, only in the exact design indicia to be etched, printed to it by the printer;

(c) further securing the stencil, which has been applied to the wetted glass, by scraping across the surface of the stencil, with a straight edged tool, to force out any remaining air and pockets of the aqueous solution;

(d) allowing the adhesive aqueous solution to evaporate from the wetted stencil and glass to further complete the detachable bond between the stencil and the glass, facilitated by the adhesive binding the stencil to the glass;

(e) applying a glass etching compound to all permeable areas of the printed stencil including that area of the stencil resist layer delineated to it by the thermal print perforations, allowing the etch compound to percolate down through the bi-layer stencil where it is in direct contact with the glass to be etched, and allowing sufficient time for the glass etching compound in contact with the glass to react and complete a permanent mark substantially similar to the design indicia printed on the stencil;

(f) removing the stencil from the glass surface; and (g) cleaning the glass containing any residual glass etchant compound and/or adhesive, with a glass cleaner or detergent.

Disclosed herein is a process to permanently chemically etch a glass substrate comprising the steps herein listed:

(a) placing upon a glass surface, a preprinted thermal bi-layer stencil media manufactured with a pervious layer, permeable to glass etching compounds and a resist layer, non-permeable to glass etching compounds; in which said bi-layer stencil is printed with a design indicia, including but not limited to, a serial number, VIN number, logo, barcode, or picture; in which said non-permeable resist layer is rendered permeable, by thermal perforations from a thermal print head, only in the exact design indicia to be etched, printed to it by the printer;

(b) saturating said stencil placed upon the clean glass surface with an aqueous adhesive solution;

(c) securing the stencil, which has been applied to the wetted glass, by scraping across the surface of the stencil, with a straight edged tool, to evacuate any trapped air or aqueous adhesive solution between the saturated stencil and the glass, and to force aside droplets of the aqueous adhesive solution;

(d) allowing the adhesive aqueous solution to evaporate from the saturated stencil and glass to further complete the detachable bond between the stencil and the glass, facilitated by the adhesive binding the stencil to the glass;

(e) applying a glass etching compound to all permeable areas of the printed stencil including that area of the stencil resist layer delineated to it by the thermal print perforations, allowing the etch compound to percolate down through the bi-layer stencil where it is in direct contact with the glass to be etched, and allowing sufficient time for the glass etching compound in contact with the glass to react and complete a permanent mark substantially similar to the design indicia printed to the stencil;

(f) removing the stencil from the glass surface; and (g) cleaning the glass containing any residual said glass etchant compound and/or said adhesive, with a glass cleaner or detergent.

Disclosed herein is a process to secure a bi-layer stencil to a smooth substrate comprising the steps herein listed:

(a) applying to a clean substrate, an aqueous adhesive solution;

(b) applying to the wetted substrate resist side down, a preprinted thermal bi-layer stencil; said bi-layer stencil media manufactured with a permeable layer and a resist layer; in which said bi-layer stencil is printed with a design indicia, including but not limited to, a serial number, VIN number, logo, barcode, picture, in which said non-permeable resist layer is rendered permeable, by thermal perforations from a thermal print head, only in the exact design indicia printed to it by the printer;

(c) further securing the stencil, which has been applied to the wetted substrate, by scraping across the surface of the stencil, with a straight edged tool, to force out any remaining air and pockets of the aqueous solution; and (d) allowing the adhesive aqueous solution to evaporate from the wetted stencil and substrate to further complete the detachable bond between the stencil and the substrate, facilitated by the adhesive binding the stencil to the substrate.

The present invention can be further described by way of two examples, but it is to be understood that the suggested invention is not construed in any respect as being limited to the examples as will be described herein below.

EXAMPLE 1

Preparation of an adhesive aqueous solution.

100 grams of raw polyvinyl alcohol (PVA) beads are mixed with 1.75 liters of hot water and agitated until the mixture is homogenized. This is let to cool. To this mixture 1.75 liters of denatured alcohol is mixed to form an adhesive aqueous solution.

Preparation of a glass etching compound.

To 1 gallon of boiling water, 250 grams of sucrose is added. Next 750 grams of ammonium biflouride flakes are added and agitated to make a consistent mixture that has a thick paste like viscosity which will not run when applied to vertical or curved surfaces.

Preparation of the bi-layer stencil mask.

A bilayer thermal stencil media roll is loaded into a wireless networked direct thermal printer situated so the non-permeable to glass etchant, thermoplastic resin film resist layer of the stencil roll is in direct contact with the thermal print head. An image to be etched is designed and imputed by means of a wireless mobile handheld networked computer and corresponding application software and the subsequent image is printed into the bilayer media by which the thermoplastic resin layer of the stencil media is micro perforated by the irradiating heat of the thermal print head in only that design which is desired to be etched. It is noted that this entire stencil print process was accomplished using wireless network communication in a mobile setting.

Process to etch the glass.

A clean tempered glass is sprayed with the aqueous adhesive solution onto the area of the glass which is to be etched. The printed stencil mask is then applied to the wetted glass so that the permeable layer of the stencil is facing outward and the non-permeable resist layer is in contact with the glass. A natural wicking of the aqueous adhesive into the stencil media should occur and is currently held mostly in place by surface tension. The printed stencil is scraped with a straight edge of a plastic card to; assure of no air bubbles or large pockets of adhesive liquid between the stencil and the glass, and to promote adhesion between the surface of the glass and the stencil. The aqueous adhesive is now allowed to evaporate to complete the adhesive bond between the glass and the stencil facilitated by the PVA in the aqueous adhesive solution. The surface of the marking stencil is brushed with a layer of said etching compound and the compound is aided through it by the pressure of the brush strokes through the permeable stencil layer, including the now permeable, in only the exact layout designed and printed to be etched, resist layer of the stencil, and percolates through and down onto the glass to be etched. After 3 minutes, the stencil along with a substantial remaining amount of glass etchant on top thereof is pulled from the glass and the remaining glass etchant residue and any remaining adhesive is cleaned, using any normal household or industrial glass cleaner, from the glass to immediately stop the glass from being etched further. A precise image substantially identical to the image printed into the mask is permanently rendered into the glass.

EXAMPLE 2

Preparation of an adhesive aqueous solution.

8 U.S. tablespoons of high fructose corn syrup are added and mixed to 1.75 liters of ethanol and 1.75 liters of distilled water.

Preparation of a glass etching compound.

For this example, an ammonium biflouride solution prepackaged under the brand "Vari-Etch" cream and manufactured by His Glassworks from Asheville N.C., USA will be used.

Preparation of the bi-layer stencil mask.

A bilayer thermal stencil media preloaded into a 1" wide cassette cartridge as described in U.S. Pat. No. 5,771,803, is loaded into a compatible handheld thermal printer sold under the part number "P-Touch 1650" label maker from the Brother International brand and is situated so the non-permeable to glass etchant, thermoplastic resin film resist layer of the stencil paper is in direct contact with the integrated thermal print head. A vehicle identification number, or VIN, to be etched is imputed by means of the integrated thermal printer keypad and the subsequent alphanumeric text is printed into the bilayer media by which the thermoplastic resin layer of the stencil media is micro perforated by the irradiating heat of the thermal print head in only that design which is desired to be etched. It is noted that this entire stencil print process was accomplished using a battery operated printer in a mobile setting.

Process to etch the glass.

A clean laminated vehicle windshield glass is sprayed with the aqueous adhesive solution onto the area of the glass which is to be etched. The bottom thermoplastic resin layer of the stencil mask is also sprayed with the described aqueous adhesive compound. The printed stencil mask is then applied to the wetted glass so that the permeable layer of the stencil is facing outward and the wetted non-permeable thermoplastic coated resist layer is now in contact with the wetted glass. A further natural wicking of the aqueous adhesive into the stencil media should occur and is currently held mostly in place by surface tension. The stencil is scraped with a straight edge of a plastic card to; assure of no air bubbles or large pockets of adhesive liquid between the stencil and the glass, and to promote adhesion between the surface of the glass and the stencil. The aqueous adhesive is now allowed to evaporate to complete the adhesive bond between the glass and the stencil facilitated by the fructose in the aqueous adhesive solution. The surface of the marking stencil is dabbed with a foam applicator with two thin applications of said etching compound and the compound is aided through it by the pressure of the foam dauber through the permeable layer, including only the printed portions of the stencil resist layer now rendered permeable via thermal printing, in the exact layout designed to be etched, and percolates down onto the glass to be etched. After 5 minutes, the stencil along with a substantial remaining amount of glass etchant on top thereof is pulled from the glass and the remaining glass etchant residue and any remaining adhesive is cleaned from the glass with "Sprayway" brand glass cleaner and a clean towel to immediately stop the glass from being etched further. A precise vehicle identification number substantially identical to the VIN printed into the stencil is permanently rendered into the glass.

What I claim as my invention is:

1. A process to permanently chemically etch a glass substrate comprising the steps herein listed:
   (a) applying an aqueous adhesive solution to an area to be etched of the glass substrate, wherein the acidic aqueous adhesive solution comprises about 100 grams of raw polyvinyl alcohol beads mixed with about 1.75 liters of water and about 1.75 liters of denatured alcohol;
   (b) applying a preprinted thermal bi-layer stencil to the acidic aqueous adhesive solution wetted area to be etched, said preprinted thermal bi-layer stencil comprising: a previous layer, permeable to glass etching compounds; and a resist layer, non-permeable to glass etching compounds; wherein said preprinted thermal bi-layer stencil is printed with a design indicia;
   (c) scraping across the surface of the preprinted thermal bi-layer stencil with a straight edged tool;
   (d) allowing the acidic aqueous adhesive solution to evaporate from the preprinted thermal bi-layer stencil and the area to be etched;
   (e) applying a glass etching compound to the pervious layer of the preprinted thermal bi-layer stencil;
   (f) removing the preprinted thermal bi-layer stencil from the area to be etched; and
   (g) cleaning the area to be etched.

2. The process of claim 1, wherein the design indicia is printed on the resist layer of the preprinted thermal bi-layer stencil with a thermal print head.

3. The process of claim 2, wherein applying a glass etching compound to the previous layer of the preprinted thermal bi-layer stencil comprises applying a glass etching compound to the design indicia printed on the pervious layer.

4. The process of claim 1, wherein allowing the acidic aqueous adhesive-solution to evaporate from the preprinted thermal bi-layer stencil and the area to be etched comprises allowing the acidic aqueous adhesive solution to fully evaporate from the preprinted thermal bi-layer stencil and the area to be etched.

5. The method of claim 4, further comprising increasing the evaporation rate of said acidic aqueous adhesive solution with the use of one of an electric heat gun or a butane heater.

6. The method of claim 1, wherein the resist layer is printed with the design indicia by thermal perforations from a direct thermal printer.

7. The process of claim 1, wherein the preprinted thermal bi-layer stencil is applied to the area to be etched with the resist layer toward the area to be etched.

8. The process of claim 1, further comprising:
   allowing the etch compound to percolate down through the preprinted thermal bi-layer stencil until the etch compound is in direct contact with the glass to be etched; and
   allowing a specified amount of time for the glass etching compound in contact with the glass to etch the design indicia in the glass substrate.

9. A process to permanently chemically etch a glass substrate comprising:
   (a) applying an aqueous adhesive solution to the glass substrate in an area to be etched, wherein the aqueous adhesive solution comprises about 100 grams of raw polyvinyl alcohol beads mixed with about 1.75 liters of water and about 1.75 liters of denatured alcohol;
   (b) applying a preprinted thermal bi-layer stencil to the area to be etched;
   (c) scraping across a surface of the preprinted thermal bi-layer stencil with a straight edged tool;
   (d) allowing the aqueous adhesive solution to fully evaporate from the preprinted thermal bi-layer stencil and the glass substrate;
   (e) applying a glass etching compound to the preprinted thermal bi-layer stencil; and
   (f) removing the preprinted thermal bi-layer stencil from the glass substrate.

10. The process of claim 9, further comprising applying the aqueous adhesive solution to the preprinted thermal bi-layer stencil before applying the preprinted thermal bi-layer stencil to the glass substrate.

11. The process of claim 9, wherein the aqueous adhesive solution has a pH value of between 4.5 and 7.0.

12. The process of claim 9, wherein the aqueous adhesive solution is acidic.

13. A process to permanently chemically etch a glass substrate comprising the steps herein listed:
   (a) placing upon a glass substrate, a preprinted thermal bi-layer stencil comprising a pervious layer and a resist layer;
   (b) saturating the preprinted thermal bi-layer stencil with an aqueous adhesive solution, wherein the aqueous adhesive solution comprises about 8 U.S. tablespoons of high fructose corn syrup, about 1.75 liters of ethanol and about 1.75 liters of distilled water;
   (c) scraping across a surface of the preprinted thermal bi-layer stencil with a straight edged tool;
   (d) allowing the aqueous adhesive-solution to evaporate from the preprinted thermal bi-layer stencil and the glass substrate;
   (e) applying a glass etching compound to the preprinted thermal bi-layer stencil; and
   (f) removing the preprinted thermal bi-layer stencil from the glass substrate.

14. The process of claim 13, wherein the aqueous adhesive solution is acidic.

15. A process to secure a bi-layer stencil to a smooth substrate comprising the steps herein listed:
   (a) applying to the smooth substrate an acidic aqueous adhesive solution, wherein the aqueous adhesive solution comprises about 8 U.S. tablespoons of high fructose corn syrup, about 1.75 liters of ethanol and about 1.75 liters of distilled water;
   (b) applying to the acidic aqueous adhesive solution wetted smooth substrate a preprinted thermal bi-layer stencil; and
   (c) allowing the acidic aqueous adhesive solutions to fully evaporate from the preprinted thermal bi-layer stencil and the smooth substrate.

16. The process of claim 15, wherein the preprinted thermal bi-layer stencil comprises a permeable layer and a resist layer.

* * * * *

UNITED STATES PATENT AND TRADEMARK OFFICE
CERTIFICATE OF CORRECTION

PATENT NO. : 9,115,022 B2
APPLICATION NO. : 13/773632
DATED : August 25, 2015
INVENTOR(S) : Matthew R. Holloway Page 1 of 1

It is certified that error appears in the above-identified patent and that said Letters Patent is hereby corrected as shown below:

In the claims,

In Column 9, Line 7, insert the word --acidic-- after the words "applying an".

In Column 9, Line 15, delete the word "previous" and insert the word --pervious--.

In Column 9, Line 33, delete the word "previous" and insert the word --pervious--.

In Column 10, Line 25, delete the word "a" after the word "upon" and insert the word --the--.

Signed and Sealed this
Ninth Day of February, 2016

Michelle K. Lee
*Director of the United States Patent and Trademark Office*